United States Patent

[11] 3,566,161

[72] Inventors Larry Keith Clark
Davenport;
Peter Greenough Bartlett, Bettendorf, Iowa

[21] Appl. No. 580,809
[22] Filed Sept. 20, 1966
[45] Patented Feb. 23, 1971
[73] Assignee Gulf & Western Industries
New York, N.Y.

[54] ELECTRONIC TIMER CIRCUIT INCLUDING LINEAR RAMP FUNCTION GENERATOR AND/OR PROGRESS POINTER
2 Claims, 4 Drawing Figs.

[52] U.S. Cl. .......... 307/293, 307/269, 324/68, 328/72, 328/77, 328/146, 307/228, 328/181
[51] Int. Cl. .......... H03k 17/28
[50] Field of Search .......... 307/269, 293; 328/72, 77, 86, 129; 324/68 (A)

[56] References Cited

UNITED STATES PATENTS

| | | | |
|---|---|---|---|
| 2,741,742 | 4/1956 | Moore | 324/68 |
| 3,297,883 | 1/1967 | Schulmeyer et al. | 307/269X |
| 3,310,688 | 3/1967 | Ditkofsky | 328/146X |
| 3,365,586 | 1/1968 | Billings | 307/235 |
| 3,273,060 | 4/1966 | Schneider | 330/30 |
| 3,402,353 | 9/1968 | Hubbs | 328/128 |
| 2,269,603 | 1/1962 | Rockwood | 324/68 |
| 2,933,681 | 4/1960 | Crain | 324/68 |
| 3,335,332 | 8/1967 | Zdzieborski | 324/68 |

*Primary Examiner*—Donald D. Forrer
*Assistant Examiner*—Larry N. Anagnos
*Attorney*—Meyer, Tilberry and Body

ABSTRACT: There is provided in one aspect of the present invention an electronic timer circuit having a progress pointer which visually indicates the elapsed time in linearly calibrated time units, and in another aspect a linear electronic timer circuit including a novel ramp function generator for providing a potential which varies linearly with elapsed time, and means for comparing the potential with a second potential and developing an output signal when the values of the two potentials are substantially equal.

INVENTORS.
PETER G. BARTLETT &
LARRY K. CLARK
BY
Meyer, Tilberry & Body
ATTORNEYS INVENTORS.
PETER G. BARTLETT &
LARRY K. CLARK
BY
Meyer, Tilberry & Body
ATTORNEYS

ELECTRONIC TIMER CIRCUIT INCLUDING LINEAR RAMP FUNCTION GENERATOR AND/OR PROGRESS POINTER

This invention relates to the art of timers and, more particularly, to an improved electronic timer circuit employing linear timing.

The invention is particularly applicable for use in timing a predetermined period of time and then energizing a load and will be described with particular reference thereto; although, it is to be appreciated that the invention has broader applications and may be used wherever applications require accurate time controlled operations.

Timers known heretofore have included both electromechanical and electronic timers. Due to their extensive use of moving parts, electromechanical timers are normally limited for use in dust free environments, for timing relatively long minimum timing periods, and exhibit relatively short operating lifetimes.

Electronic timers known heretofore normally include a relaxation oscillator circuit incorporating a capacitor which charges exponentially until the voltage stored attains a level equal to the firing voltage of an electronic control device, such as a thyratron tube or a silicon controlled rectifier. The time period is the time required for the capacitor to charge from its initial level to the level of the firing voltage. The timed period is varied by adjusting a potentiometer, or the like, to either increase or decrease the level of the firing voltage and, thereby, respectively increase or decrease the timed period. Since the voltage stored by the capacitor increases exponentially, and not linearly, with elapsed time, it is extremely difficult to accurately predict the resultant timed period for any given potentiometer adjustment. This problem might be partially overcome by calibrating the potentiometer in a nonlinear manner in accordance with the characteristic exponential charging the timing capacitor. It is, however, quite difficult to calibrate potentiometers in this manner with any reliable degree of accuracy for timing applications.

It is also desirable that timers be provided with a progress pointer which, during the timing operation, serves to visually indicate either the elapsed time or the remaining time of the selected time period. Electromechanical timers frequently include a progress pointer which is carried by a synchronous motor driven shaft. Electronic timers known heretofore, however, are not provided with means for visually indicating elapsed time or remaining time of a selected time period during the timing operation.

The present invention is directed in one aspect toward an electronic timer having a progress pointer and in another aspect toward an electronic timer employing linear timing, thereby overcoming the noted disadvantages, and others, of such previous electronic timers.

In accordance with one aspect of the present invention, the electronic timer includes means, such as a potentiometer, for providing a reference potential indicative of a selected time period, and which potential is carried on an output circuit; means, such as a ramp function generator, for developing, when energized, a second potential which progressively varies in value with elapsed time toward the value of the reference potential, with the second potential being carried by another output circuit; means for energizing the developing means; means, such as a differential amplifier, for comparing the reference potential and the second potential and developing an output signal when the values of the two potentials are substantially equal; and, an ammeter having a dial face calibrated in time units and a pointer, with the ammeter being connected in series between the two output circuits so that the time required for the voltage difference between the two potentials to decrease from the initial difference, when the developing means is initially energized, to a zero difference, is continuously visually displayed by the position of the pointer with respect to the dial face.

In accordance with a more limited aspect of the present invention, the developing means includes a linear ramp function generator so that the second potential varies linearly with elapsed time, and that the ammeter dial face is linearly calibrated in time units so that the pointer visually indicates the elapsed time and time remaining of the selected time period in linearly calibrated time units.

In accordance with another aspect of the present invention, there is provided a linear electronic timer which includes means for providing a reference potential representative of a selected time period; linear ramp function generating means for developing, when energized, a second potential which linearly varies in value with elapsed time toward the value of the reference potential; means for energizing the generating means; and, means for comparing the reference potential and the second potential and developing an output signal when the values of the two potentials are substantially equal.

Further in accordance with the present invention, the linear ramp function generating means of the linear timer includes an operational amplifier having negative feedback.

The primary object of the present invention is to provide a linear timer which exhibits an output potential which linearly varies with elapsed time.

A still further object of the present invention is to provide a timer which generates a linear timing function and, hence, is less susceptible to transients and therefore more repeatable and accurate in operation than RC timers.

In accordance with a still further object of the present invention, there is provided an electronic timer having means for visually displaying the elapsed time and remaining time of a selected timing period during operation of the timer.

In accordance with a still further aspect of the present invention, there is provided a timing circuit which does not charge a capacitor in an exponential manner and, accordingly, does not require a large timing capacitor with resultant difficulties in attaining temperature compensation without the use of expensive components.

In accordance with a still further aspect of the present invention, there is provided a linear timer including circuitry which is self-compensating for changes in temperature, and wherein no additional or economically expensive components are required to improve repeatability and accuracy.

These and other objects and advantages of the invention will become apparent from the following description of the preferred embodiment of the invention as read in connection with the accompanying drawings in which.

Figure 1:
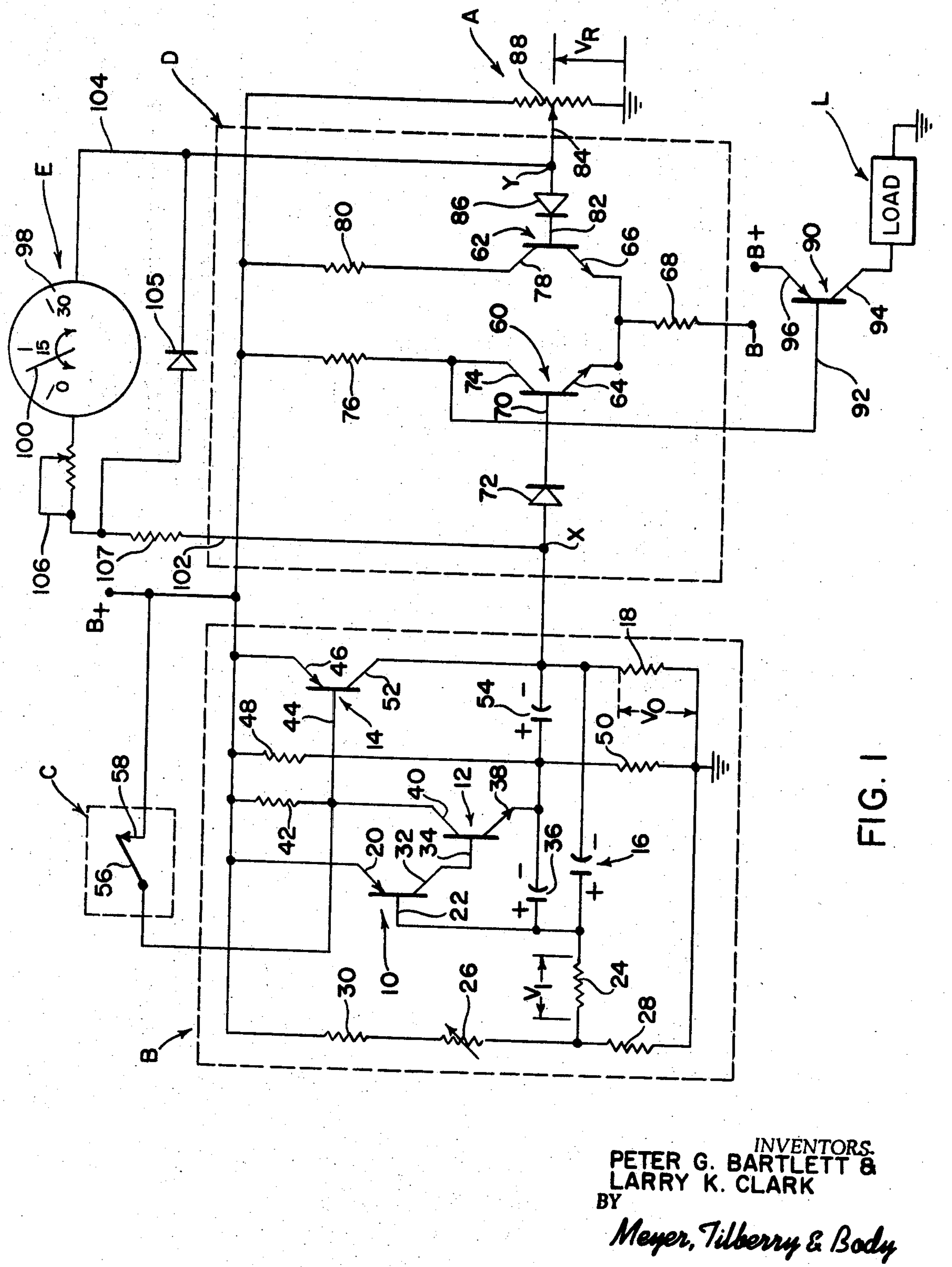
FIG. 1 is a schematic circuit diagram illustrating the preferred embodiment of the invention.

Referring now to the drawings wherein the showings are for purposes of illustrating a preferred embodiment of the invention and not for purposes of limiting same, FIG. 1 illustrates the linear timer which generally comprises a potentiometer A connected between ground and a B+ voltage supply source for providing a reference potential; a linear ramp function generator B for developing, when energized, a potential which linearly varies in value with elapsed time toward the value of the reference potential; a normally closed switch C for energizing generator B; a comparison circuit D for comparing the output potential of generator B with the reference potential and developing an output signal for energizing load L when the values of the two potentials are substantially equal; and, an ammeter E which is linearly calibrated in time units so that its pointer continuously indicates the time required to energize load L after opening switch C.

RAMP FUNCTION GENERATOR

The linear ramp function generator B takes the form of an operational DC amplifier having negative feedback, and generally comprises transistors 10, 12, 14; a negative feedback capacitor 16; and, an output resistor 18. Transistors 10 and 14 are PNP transistors and transistor 12 is an NPN transistor. Transistor 10 has its emitted 20 connected directly to the B+ voltage supply source and its base 22 connected through an input timing resistor 24 to the junction of resistors 26 and 28. Resistors 26, 28 and 30 are connected together in series and form a voltage divider between the B+ voltage supply source and ground. Resistor 26 is a variable resistor for adjusting the input voltage $V_1$ applied across resistor 24, to be discussed in greater detail hereinafter. The collector 32 of transistor 10 is directly connected with the base 34 of transistor 12. A capacitor 36 is connected between the junction of base 22 of transistor 10 and resistor 24 to the emitter 38 of transistor 12. The collector 40 of transistor 12 is connected through a resistor 42 to the B+ voltage supply source. The junction of collector 40 and resistor 42 is connected directly to the base 44 of transistor 14, which has its emitter 46 directly connected to the B+ voltage supply source. A voltage divider including series connected resistors 48 and 50 is connected between the B+ voltage supply source and ground for purposes of lowering the collector voltage of transistor 10. The junction of resistors 48 and 50 is connected to emitter 38 of transistor 12 as well as to the collector 52 of transistor 14 through a capacitor 54. The negative feedback capacitor 16 for the amplifier is connected between collector 52 of transistor 14 and the junction of resistor 24 and base 22 of transistor 10. The output resistor 18 is connected between the junction of capacitor 16 and collector 52 of transistor 14 and ground.

Switch C, illustrated in FIG. 1, is a single pole, single throw, normally closed switch having a movable contact 56 and a stationary contact 58. Switch C is connected between the B+ voltage supply source and the junction of resistor 42 and collector 40 of transistor 12, as well as directly to the base 44 of transistor 14. It is to be appreciated that switch C may take other forms such as normally closed contacts of a relay, or a transistor.

COMPARATOR CIRCUIT

The comparator circuit D preferably takes the form of a differential amplifier which includes NPN transistors 60 and 62. The emitters 64 and 66 of transistors 60 and 62, respectively, are connected together in common and thence through a resistor 68 to a B− voltage supply source. The base 70 of transistor 60 is connected to the junction of resistor 18 and collector 52 of transistor 14 through a diode 72, poled as shown in FIG. 1. The collector 74 of transistor 60 is connected to the B+ voltage supply source through a resistor 76. Similarly, the collector 78 of transistor 62 is connected to the B+ voltage supply source through a resistor 80. The base 82 of transistor 62 is connected to the wiper arm 84 of potentiometer A through a diode 86, poled as shown in FIG. 1. The resistance portion 88 of potentiometer A is connected between the B+ voltage supply source and ground.

Load L is connected to collector 74 of transistor 60 through a PNP transistor 90. More particularly, transistor 90 has its base 92 directly connected with collector 74 of transistor 60, and its collector 94 connected to ground through load L. The emitter 96 of transistor 90 is connected to the B+ voltage supply source.

Ammeter E is a standard ammeter, such as International Instrument's Model 1122, 0 to 100 microamperes. The ammeter has a dial face 98, a pointer 100 and two leads 102 and 104. The dial face 98, however, is provided with a scale which is linearly calibrated in time units displaying, as shown in FIG. 1, numerals 0, 15 and 30 for respectively indicating 0 seconds, 15 seconds and 30 seconds. The ammeter is calibrated so that a full scale deflection of pointer 100 indicates a maximum selected time period, such as 30 seconds. No deflection of pointer 100 is indicative of 0 seconds, a timed out condition. Lead 102 is connected through a variable resistor 106 and a fixed resistor 107 to point X located between the junction of resistor 18 and collector 52 of transistor 14 and diode 72. Lead 104 is connected to point, Y, which is located between wiper arm 84 and diode 86. Thus, so long as there is a potential difference between points X and Y current flows through the ammeter, whereby pointer 100 is deflected from the 0 indication. A diode 105, poled as shown in FIG. 1, is connected between the junction of resistors 106 and 107 and point Y to protect the ammeter when the potential at point X becomes greater than that at point Y.

Figure 2:
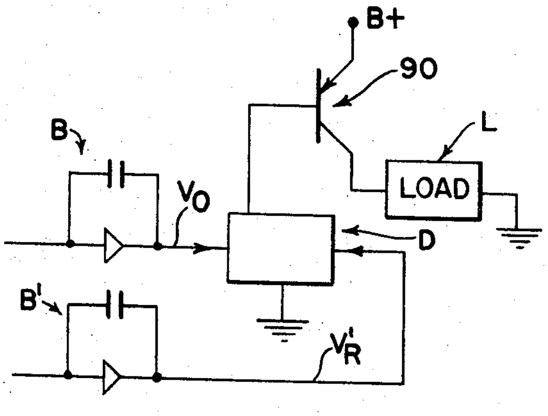
FIG. 2 is a block diagram version of a second aspect of the invention.
Figure 3:
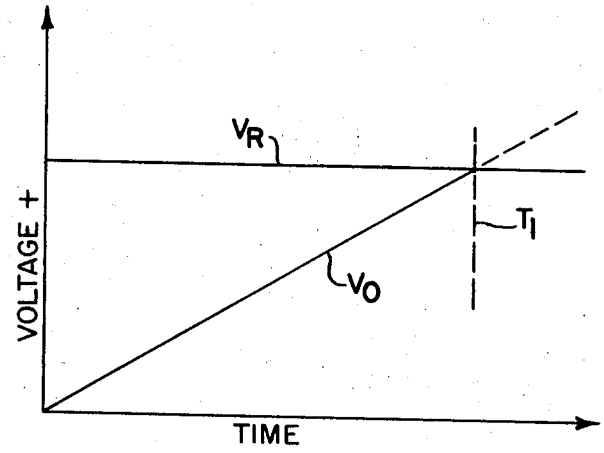
FIG. 3 is a graphical representation of the operation of the embodiment illustrated in FIG. 1; and, FIG. 4 is a graphical representation of the operation of the aspect of the invention illustrated in FIG. 2.
Figure 4:
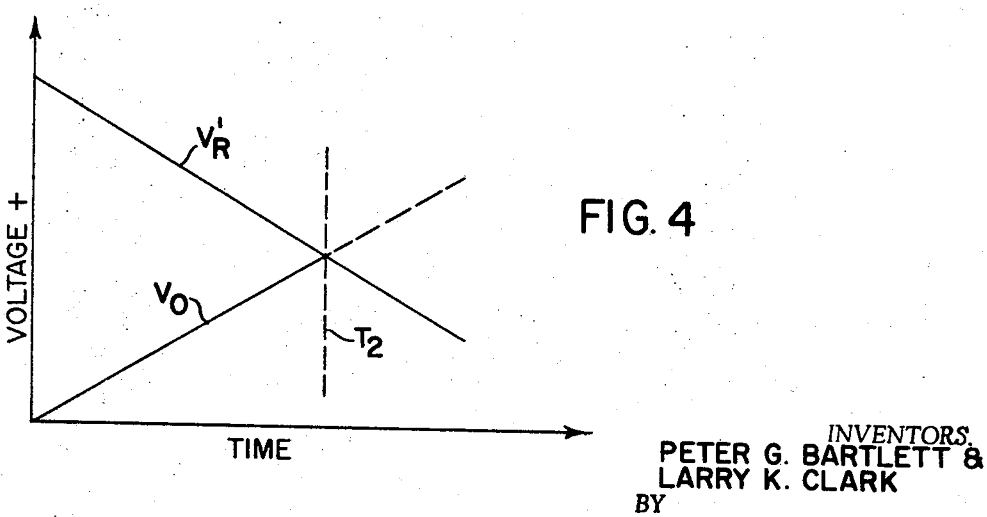

Reference is now made to FIG. 2 which illustrates a second aspect of the invention similar to that shown in FIG. 1 and, accordingly, like components are identified with like character references. The embodiment illustrated in FIG. 2 includes a linear ramp function generator B constructed as illustrated in the schematic circuit of FIG. 1, a comparator circuit D constructed as shown by the circuit diagram in FIG. 1, and load L coupled to comparator D by means of transistor 90. However, the circuit illustrated in FIG. 2 does not include potentiometer A illustrated in FIG. 1 for providing the reference voltage. Instead, a varying reference voltage is provided by a second ramp function generator B′ which is constructed of circuit components comprising the complement of those illustrated in FIG. 1. The output voltage $V_0$ taken across load resistor 18 of generator B linearly increases with elapsed time in a positive direction, as shown by the wave form in FIG. 3. As will be described in greater detail hereinafter, the value of voltage $V_0$ is compared with the reference voltage $V_R$ taken between ground and the position of wiper arm 84 of potentiometer A. This comparison is illustrated in FIG. 3. The reference voltage $V_R'$ developed by generator B′ linearly decreases in value with elapsed time in a negative direction, and is compared with the value of voltage $V_0$. This comparison is illustrated in FIG. 4.

OPERATION

As long as switch C is closed, as is shown in FIG. 1, B+ potential is applied to base 44 of transistor 14, maintaining the output voltage $V_0$ of generator B at substantially ground potential. The desired time delay may now be adjusted by positioning wiper arm 84 of potentiometer A. This adjusts the value of the reference voltage $V_R$, whereupon a potential difference exists between points Y and X. Thus, current flows from the B+ voltage supply source through wiper arm 84, and from point Y to point X through ammeter E and resistors 106 and 107. Accordingly, pointer 100 is deflected in accordance with the value of current flowing through leads 104 and 102. For example, wiper arm 84 may be adjusted so that pointer 100 is positioned over the numeral 15 on the calibrated dial face 98, indicating that the selected timed period or time delay is 15 seconds. During the period that switch C is closed, the negative side of capacitor 16 is reference to ground and the capacitor is charged by the current flowing from the emitter to base of transistor 10. The value of the charge stored by capacitor 16 is, therefore, the value of the B+ potential minus the voltage drop between the emitter and base of transistor 10.

When switch C is opened, by breaking electrical contact between contacts 56 and 58, a potential $V_1$ is applied across resistor 24. The value of potential $V_1$ is determined by the potential stored by capacitor 16 and the setting of the potential divider comprised of resistors 26, 28 and 30. Capacitor 16 commences to discharge through resistors 24, 28 and 18, thereby slightly decreasing the potential stored by capacitor 16. As the value of the potential stored by the capacitor decreases, transistor 10 begins to conduct. Current flows from the B+ voltage supply source through the emitter to collector of transistor 10 into the base 34 of transistor 12, causing transistor 12 to conduct. As transistor 12 begins to conduct, the potential appearing on its collector 40 decreases toward ground potential. As this occurs, transistor 14 begins to conduct. Current therefore commences to flow from the emitter to collector of transistor 14, whereupon a voltage begins to build up across the output resistor 18. This voltage increase across resistor 18 lifts the potential at the negative end of capacitor 16 to a point above ground potential. Since the voltage across capacitor 16 cannot change instantaneously, the potential at the positive end of the capacitor is also raised instantaneously the same amount as on the negative end. This tends to turn off transistors 10, 12 and 14. Capacitor 16 then discharges again through resistors 24, 28 and 18. Again, transistors 10, 12 and 14 begin to conduct, applying more potential across output resistor 18. The circuit continues to function in this manner so that for a square wave input a linear ramp function is produced, appearing as output voltage $V_0$ across resistor 18. So long as the reset switch C is not initiated, this linear ramp function will continue until transistor 14 is completely saturated. Upon saturation of transistor 14, the output voltage $V_0$ across resistor 18 is equal to the value of the B+ potential minus the saturation voltage of transistor 14. This voltage remains constant until the reset switch C is closed.

Assuming that the voltage gain and input impedance of generator B are relatively large, the equation for the output voltage $V_0$ is substantially as follows:

$$V_0 = -\frac{1}{R_{24}C_{16}}\int_0^t V_1 dt$$

$$= -\frac{V_1}{R_{24}C_{16}} t$$

where:

$R_{24}$ = the resistance of resistor 24.

$C_{16}$ = the capacitance of capacitor 16.

$t$ = time in seconds.

This equation shows that the output voltage $V_0$ is a linear function, and dependent on the gain of the amplifier only that the gain must be relatively large. Capacitors 36 and 54 are used in this circuit to prevent the DC amplifier from oscillating. This circuit is calibrated such that from the time switch C is opened until the point in time that transistor 14 has saturated, the maximum timing expected has elapsed. Calibration is accomplished by varying the value of resistor 26. This allows the input voltage $V_1$ to be adjusted to compensate for the tolerance of the components used. Resistors 48 and 50 form a voltage divider to lower the voltage across the first two stages of the DC amplifier. In this way, leakage in the first two stages is kept at a minimum over the entire temperature range. The input voltage $V_1$ will vary over the temperature range with changes in the voltage drop from the emitter to base of transistor 10. Resistor 24 is chosen of sufficiently large value that the input voltage $V_1$ is large in comparison with the voltage drop across transistor 10. At low temperatures, the emitter to base voltage drop across transistor 10 increases. This, in turn, decreases the input voltage $V_1$ which would tend to increase the length of timings. If resistor 24 is properly chosen, the change in input voltage $V_1$ is such that it compensates for changes in the value of capacitor 16 with temperature. Capacitor 16, in turn, decreases in value at low temperatures which tends to make the timing shorter. If resistor 24 is chosen properly this circuit is extremely repeatable over the entire temperature range. Once the components have been chosen and the calibration completed to yield the maximum time desired, nothing is changed in the circuit. In this manner, optimum repeatability and stability are attained over the entire temperature range.

As shown by the wave forms illustrated in FIG. 3, the output voltage $V_0$ of the generator B is continuously compared with the reference voltage $V_R$, as adjusted by potentiometer A. After a predetermined period of time $T_1$, the output voltage $V_0$ is equal to, or slightly greater than, the reference voltage $V_R$.

Initially, the output voltage $V_0$ is at ground potential. At this point in time, potentiometer A provides positive reference potential $V_R$ to the anode of diode 86. The magnitude of this potential is reflected through the diode to the emitter of transistor 62, such that a positive potential appears at the junction of the emitters of transistors 60 and 62. This potential is equal to the value of the voltage applied to the base 82 of transistor 62 minus the base to emitter voltage drop of transistor 62. Since the output voltage $V_0$ is initially at ground potential and a positive potential appears at the junction of the emitters of transistors 60 and 62, transistor 60 is reversed biased. Transistor 62, on the other hand, is forward biased and is conducting. Under these conditions, the value of the voltage appearing on the collector 74 of transistor 60 is essentially equal to that of the B+ voltage supply source, and the voltage appearing on the collector 78 of transistor 62 is at a value somewhere between ground and the B+ voltage supply source. When switch C is opened, the output voltage $V_0$ is a linear ramp function increasing in value from ground potential toward the value of the B+ voltage supply source with elapsed time. At time $T_1$, see FIG. 3, the value of voltage $V_0$ is substantially equal or slightly greater than the reference potential $V_R$, applied to the base of transistor 62. Transistor 60 becomes forward biased and begins to conduct. This, in turn, causes transistor 90 to be forward biased to energize load L. The potential existing at the junction of the emitters of transistors 60 and 62 becomes equal to the value of the output voltage $V_0$ minus the forward voltage drop of diode 72 and the base to emitter voltage drop of transistor 60. This potential at the emitters of transistors 60 and 62 reverse bias transistor 62. Either the collector 74 of transistor 60 or the collector 78 of transistor 62 may serve to drive the output circuitry.

With the circuitry as shown, tests have been conducted with the B+ voltage equal to 20 volts and with the timing circuit calibrated to yield a maximum timing of 30 seconds, and with potentiometer A adjusted so that the reference voltage $V_R$ is equal to 10 volts. Under these conditions, when switch C is opened the output voltage $V_0$ will arrive at 10 volts after a 15 second time delay. Thus, initially, the pointer arm 100 is set so that it indicates a 15 second time delay and upon opening switch C, pointer arm 100 commences to deflect toward zero.

The embodiment illustrated in FIG. 2 operates in a manner quite similar to that of the embodiment illustrated in FIG. 1. However, the generator B' is, as discussed hereinbefore, the complement of generator B so that its output voltage $V_R'$ decays from a positive potential toward a ground potential with elapsed time, in a manner as indicated in FIG. 4. After a predetermined period of time, the output voltage $V_0$ of generator B is equal to, or slightly greater than, the output voltage $V_R'$, which serves as the reference voltage. Thus, it is appreciated that in accordance with this embodiment of the invention, a linearly increasing output voltage $V_0$ is compared with a varying reference voltage $V_R'$ as opposed to the adjustably fixed reference voltage $V_R$ discussed with reference to the embodiment illustrated in FIG. 1.

In accordance with a preferred embodiment of the invention, the values and types of various components illustrated in FIG. 1 are found in TABLE I.

TABLE I

| Component | Component value or type |
|---|---|
| PNP transistors 10, 14, 90 | 2N3638. |
| NPN transistors 12, 60, 62 | 2N3565. |
| Diodes 72, 86, 105 | IN457A. |
| B+ voltage supply source | +20 volts, direct current. |
| B− voltage supply source | −20 volts, direct current. |
| Resistors 68, 76, 80 | 22 kilohms. |
| Resistors 28, 50 | 10 kilohms. |
| Resistor 30 | 5.1 kilohms. |
| Resistor 26 | Calibrate. |
| Resistor 24 | 1 megohm. |
| Resistor 42 | 3.9 kilohms. |
| Resistor 48 | 2.7 kilohms. |
| Resistor 18 | 1 kilohm. |
| Resistor 107 | 150 kilohms. |
| Resistor 106 | 100 kilohms. |
| Ammeter E | International Instrument's Model 1122. |
| Resistor 88 | 1 kilohm. |
| Capacitor 36 | 0.01 microfarad, 50 volts, direct current. |
| Capacitor 54 | 1 microfarad, 25 volts, direct current. |
| Capacitor 16 | 10 microfarads, 35 volts, direct current. |

Although the invention has been shown in connection with preferred embodiments, it will be readily apparent to those skilled in the art that various changes in form and arrangement of parts may be made to suit requirements without departing from the spirit and scope of the invention as defined by the appended claims.

We claim:

1. A linear electronic timer comprising:

means for providing a reference potential;

linear ramp function generating means for developing, when energized, a second potential which linearly varies in value with elapsed time toward the value of said reference potential;

said generating means including output circuit means for carrying said linearly varying second potential;

capacitance means connected to said output circuit means for storing a voltage;

actuable circuit means connected to said capacitance means for, upon actuation, linearly discharging said capacitance means to thereby generate said linearly varying second potential across said output circuit means;

means for energizing said generating means; and means for comparing said reference potential and said second potential and developing an output signal when the values of said two potentials are substantially equal;

said linear ramp function generator includes:

first and second transistors of the same conductivity type;

a third transistor of an opposite conductivity type than said first and second transistors;

each of said transistors having input and output circuit means, said output circuit means of said first and third transistors being respectively coupled to the input circuit means of said third and second transistors; and said capacitance means coupling said output circuit means of said second transistor with the input circuit means of said first transistor.

2. A linear electronic timer comprising:

means for providing a reference potential;

linear ramp function generating means for developing, when energized, a second potential which linearly varies in value with elapsed time toward the value of said reference potential;

means for energizing said generating means; and, means for comparing said reference potential and said second potential and developing an output signal when the values of said two potentials are substantially equal;

said linear ramp function generator includes:

first and second transistors of the same conductivity type;

a third transistor of an opposite conductivity type than said first and second transistors;

each of said transistors having first, second and control electrodes; said first electrodes of said first and third transistors being respectively directly coupled to the control electrodes of said third and second transistors, and said second electrodes of said first, second and third transistors being coupled in common; and a capacitor coupling said first electrode of said second transistor with the control electrode of said first transistor;

said generator exhibits high voltage gain and has a high input impedance and further includes an input resistor for coupling the control electrode of said first transistor to a direct current voltage source through said high impedance, said input resistor being of sufficient value that the input voltage thereacross is substantially greater than the voltage developed across the second and control electrodes of said first transistor, whereby as said second potential linearly varies with elapsed time said input resistor compensates for variations in the values of said input voltage and said capacitor due to variations in temperature.